(12) United States Patent
Bawal et al.

(10) Patent No.: US 10,908,012 B2
(45) Date of Patent: Feb. 2, 2021

(54) INITIALIZING A TEST APPARATUS FOR PROVING OPERATION OF GAS METERS

(71) Applicant: Natural Gas Solutions North America, LLC, Houston, TX (US)

(72) Inventors: Mihir Subhash Bawal, Frisco, TX (US); Cristina Alfonso Lancelot, Katy, TX (US); Jason Lee Mamaloukas, Cypress, TX (US); Jeff Thomas Martin, Spring, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 805 days.

(21) Appl. No.: 15/630,384

(22) Filed: Jun. 22, 2017

(65) Prior Publication Data

US 2018/0283927 A1 Oct. 4, 2018

Related U.S. Application Data

(60) Provisional application No. 62/480,462, filed on Apr. 2, 2017.

(51) Int. Cl.
| | | |
|---|---|---|
| *G01F 25/00* | (2006.01) | |
| *G05B 15/02* | (2006.01) | |
| *G06F 3/0481* | (2013.01) | |
| *G06F 3/0482* | (2013.01) | |
| *G06F 3/0484* | (2013.01) | |

(52) U.S. Cl.
CPC ......... *G01F 25/0007* (2013.01); *G05B 15/02* (2013.01); *G06F 3/0482* (2013.01); *G06F 3/04817* (2013.01); *G06F 3/04847* (2013.01)

(58) Field of Classification Search
CPC . G01F 25/0007; G01F 25/0053; G05B 15/02; G05B 2219/37008; G06F 3/04817; G06F 3/04847

USPC ............... 73/514.32, 1.16, 1.25–1.28, 1.36; 702/100

See application file for complete search history.

(56) References Cited

U.S. PATENT DOCUMENTS

| | | |
|---|---|---|
| 4,658,634 A | 4/1987 | Killough et al. |
| 4,922,721 A | 5/1990 | Robertson et al. |
| 4,996,870 A | 3/1991 | Deutsch |
| 5,455,781 A | 10/1995 | Reynal et al. |
| 6,453,721 B1 | 9/2002 | Grzeslo et al. |
| 6,640,140 B1 | 10/2003 | Lindner et al. |

(Continued)

FOREIGN PATENT DOCUMENTS

| EP | 1785702 | 5/2007 |
|---|---|---|

*Primary Examiner* — Robert R Raevis
(74) *Attorney, Agent, or Firm* — Paul Frank + Collins P.C.

(57) ABSTRACT

A test apparatus that guides an end user through visualization of a user interface on a web browser that is easy to operate for individuals with limited knowledge of the devices or test protocols for gas meters. The test apparatus may include the executable instructions having instructions that configure the processor to, receive input data from the web browser; compare the input data to data in a data table; select an entry from the data table that reflects a match between the input data and data associated with the entry in the data table; and generate a first output that defines a configuration for a user interface that renders on the web browser, the configuration representing a stage of a test initialization process to configure operating parameters on the controller to work with a meter-under-test that couples with the fluid moving unit for purposes of conducting a meter proof.

17 Claims, 9 Drawing Sheets

(56) References Cited

U.S. PATENT DOCUMENTS

| | | | |
|---|---|---|---|
| 7,212,953 | B1 | 5/2007 | Artiuch |
| 7,860,677 | B2 | 12/2010 | Artiuch |
| 8,248,215 | B2 | 8/2012 | bibelhausen et al. |
| 9,664,659 | B2 | 5/2017 | Martin et al. |
| 2003/0234044 | A1 | 12/2003 | Shajii et al. |
| 2009/0112368 | A1 | 4/2009 | Mann et al. |
| 2011/0172524 | A1 | 7/2011 | Hidem et al. |
| 2012/0019351 | A1 | 1/2012 | Bougaev et al. |
| 2013/0304411 | A1 | 11/2013 | Berndt et al. |
| 2014/0060449 | A1 | 3/2014 | Dole et al. |

FIG. 7

Meter Test 2M meter with TC with Optical Scanner Temperature Compensated

Step 4 Please Select Your Test Points

Select Test Points*  244

| Percent of Max Flow Rate (%) | Percent of Max Flow (m3/h) | Volume (m3) | PPT | Duration (s) | High Limit (%) | Low Limit (%) | Spam Limit (%) | Repeats |
|---|---|---|---|---|---|---|---|---|
| 100 | 2000 | 200 | 200 | 180 | 2 | 2 | 2 | 2 |
| 50 | 1000 | 200 | 200 | 360 | 2 | 2 | 2 | 2 |
| 22 | 440 | 100 | 200 | 318 | 1 | 1 | 1 | 2 |

● Save Test Profile   Run Test

FIG. 8

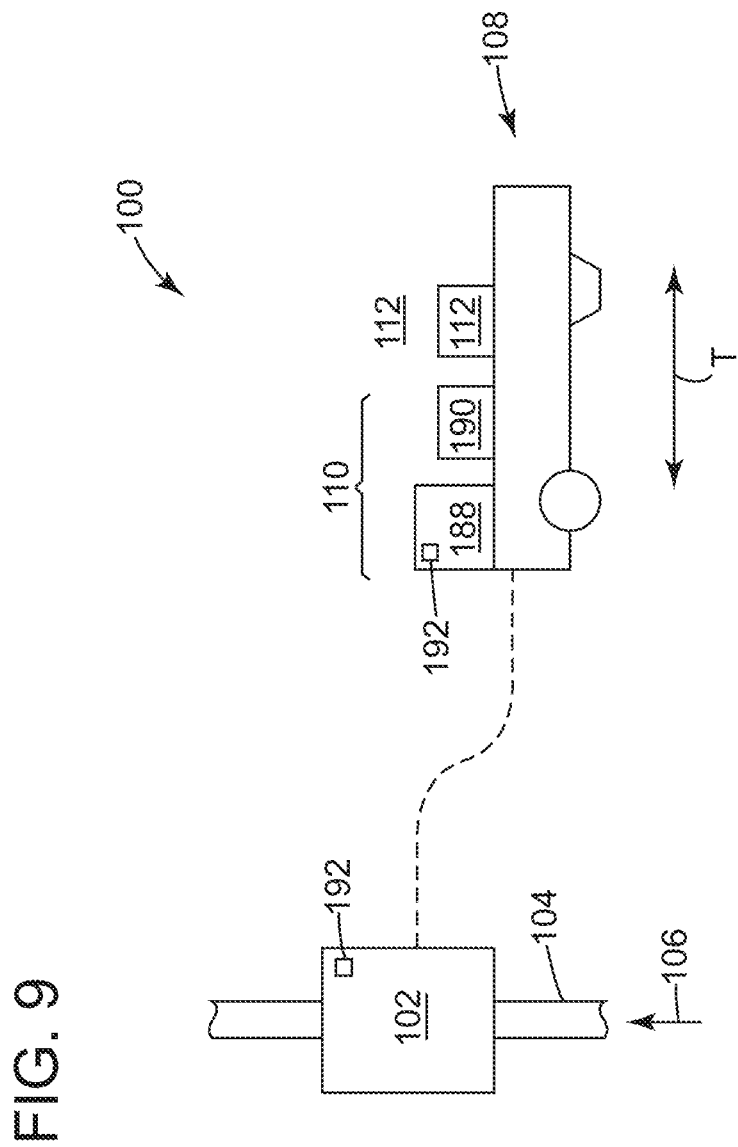

INITIALIZING A TEST APPARATUS FOR PROVING OPERATION OF GAS METERS

CROSS-REFERENCE TO RELATED APPLICATIONS

This application claims the benefit of U.S. Provisional Ser. No. 62/480,462, filed on Apr. 2, 2017, and entitled "SETTING UP TEST PROTOCOLS ON A TEST APPARATUS FOR PROVING OPERATION OF GAS METERS," the content of which is incorporated by reference herein in its entirety.

BACKGROUND

Metrology hardware finds use across a wide range of applications. For example, the fuel gas industry uses metering systems, or gas meters, to measure consumption, bill customers, and manage inventory. Some of these gas meters are mechanical, positive-displacement devices. Rotary-types of these devices may include an impeller that rotates in response to flow of gas. In other types, the flow of gas translates a diaphragm or bellows. Other mechanical devices may leverage a turbine or like rotating element (e.g., a pinwheel). In use, the gas meter (or collateral system) can monitor movement of the working mechanism to quantify the amount of gas. Precise allocations, however, may require more complex calculations to account for certain factors like line pressure, flow rate, and temperature that prevail at the location of the gas meter.

SUMMARY

The subject matter disclosed herein relates to systems to test or "prove" metrology hardware like gas meters. The embodiments may relate to those described in co-pending and co-owned U.S. patent application Ser. No. 14/534,025, filed on Nov. 5, 2014, and entitled "APPARATUS AND METHOD FOR TESTING GAS METERS" and U.S. patent application Ser. No. 15/581,521, filed on Apr. 28, 2017, and entitled, "APPARATUS AND METHOD FOR TESTING GAS METERS." However, of particular interest herein are embodiments that are configured to simplify user interaction to initially set-up the test apparatus for use to administer the meter proof. These configurations effectively minimize tasks that an end user performs to set-up the test apparatus to complete the desired test.

Most gas meters must conform to "legal metrology" standards that regulatory bodies promulgate under authority or legal framework of a given country or territory. These standards protect public interests, for example, to provide consumer protections for metering and billing use of fuel gas. These protections may set definitions for units of measure, realization of these units of measure in practice, application of traceability for linking measurement of the units made in practice to the standards and, importantly, ensure accuracy of measurements.

These standards make it is necessary to test or "prove" gas meters to ensure that it performs to meet these standards. Some embodiments may be used for this purpose. In use, the embodiments may pass a test gas through the meter-under-test and through a "master meter," preferably one that is known to meet the accepted performance standard. To arrive at the meter accuracy, the meter proof leverages techniques that look at the relationship between the volume of air that passes through the meter-under-test and the volume registered by the master meter.

The embodiments that perform the meter proofs are generally simple in design. The test apparatus may include a cart-like structure that carries test components like the master meter(s), a fluid source (e.g., a blower), and sensors to collect data relevant to the proof of the meter-under-test. The test components may also include a controller (or control structure) that is useful to operate the test components to administer the meter proof. The controller may execute instructions (or "software" or "firmware") that configure the device to regulate operation of the fluid source. These instructions may also configure the controller to perform data analysis to arrive at the measured accuracy of the meter-under-test. Some embodiments may wholly integrate the controller on-board the test apparatus, although this disclosure contemplates use of separate, remote computing devices (e.g., a lap-top, tablet, etc.) that couple with on-board control structure via an appropriate connection (e.g., USB, RS-232, Bluetooth®, etc.).

But while simple in design, the embodiments address certain drawbacks found in existing systems for proving gas meters (and related devices). Some embodiments provide a user interface configured to limit interaction by the end user. These configurations instead guide the end user through the test initialization process, typically requiring around 4 stages (rather than 10 or more in some designs) to complete the process and start the meter proof. To do this, some embodiments may leverage previously-entered and stored pieces of information to set, or configure, the user interface for subsequent data entry by the end user. The embodiments may compare the subsequently-entered information to pre-stored data tables to identify and, in turn, define the next configuration for the user interface. In this way, the embodiments simplify the learning curve to allow individuals to initialize the test apparatus and perform the meter proof with even limited knowledge or experience with the device.

DRAWINGS

Reference is now made briefly to the accompanying drawings, in which:

FIG. 7 depicts an example of the user interface of FIG. 3;

FIG. 8 depicts an example of the user interface of FIG. 3; and

FIG. 9 depicts a schematic diagram of the test apparatus of FIG. 1 with additional components that may be used to administer the meter proof.

Figure 1:
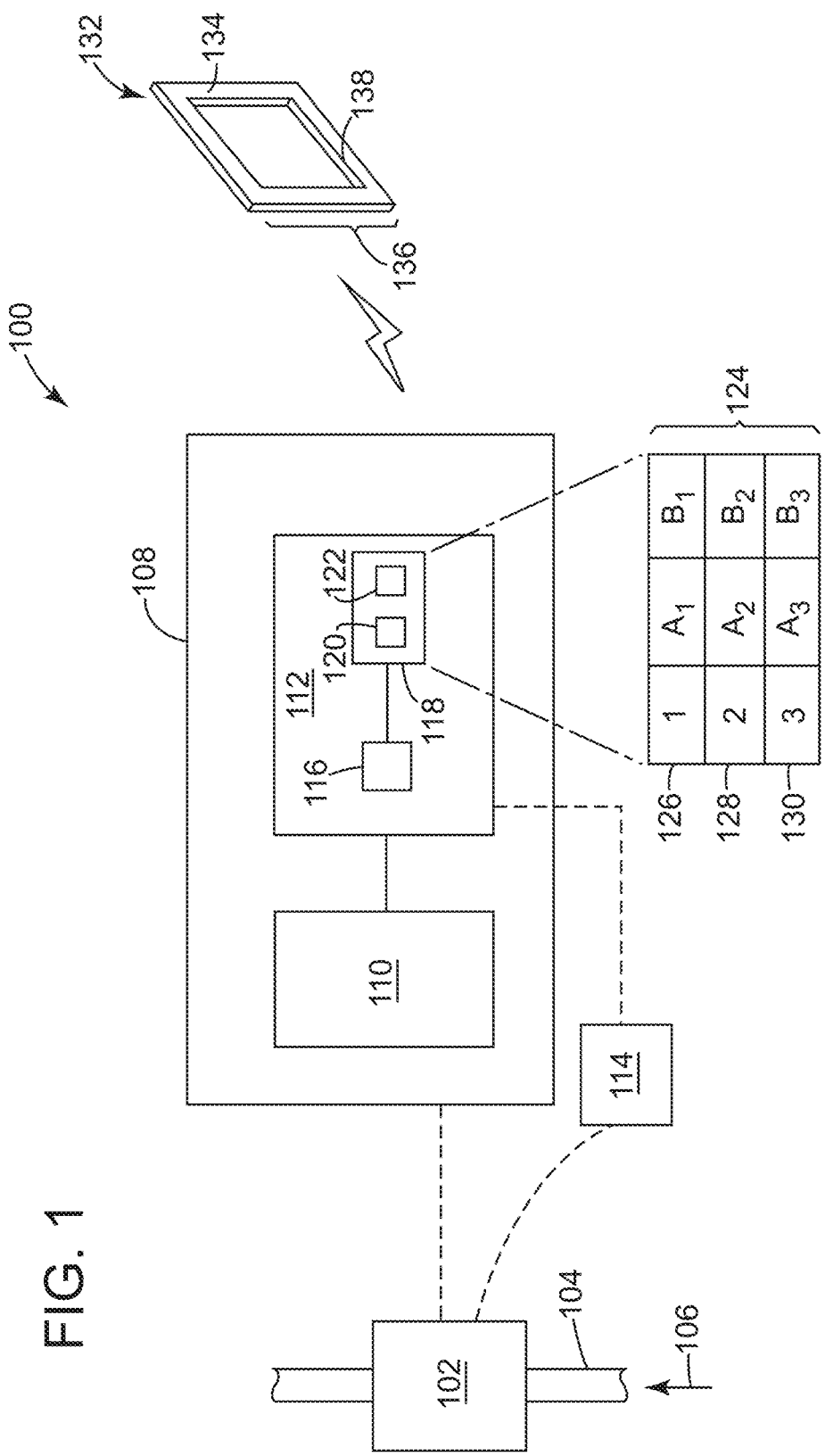
FIG. 1 depicts a schematic diagram of an exemplary embodiment of a test apparatus to administer a meter proof on a meter-under-test.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below introduces a test apparatus that is easy to operate for individuals with limited knowledge of these devices or test protocols to "prove" operation of gas meters. The embodiments may be configured to exchange data with a remote device, like a laptop or tablet, so as to guide the end user through visualization of a user interface on a web browser. This user interface can be configured with simple, easy to follow instructions on screen so the end user can complete a test initialization process in short order. This test initialization process is, effectively, a multi-stage process to prepare the test apparatus to work with and administer the meter proof under test parameters that correspond to the subject gas meter. Once this preliminary process is complete, the embodiments may then cause the test apparatus to operate to administer the meter proof. Other embodiments are within the scope of the subject matter herein.

FIG. 1 illustrates a schematic diagram of an exemplary embodiment of a test apparatus 100 for use to administer a test protocol or "meter proof." This embodiment is shown coupled with a meter-under-test 102 that may reside in flow connection with a conduit 104 that carries material 106. In the discussion that follows, the material 106 may be fuel gas, but other fluids (e.g., liquids and gases) may substitute in this disclosure. The representation in the diagram is similar to devices in the field, for example, where the meter-under-test 102 is part of a gas distribution system for residential and commercial customers; however, the embodiments may also benefit use "in-house" to qualify flow devices at the time of manufacture as well. In one implementation, the test apparatus 100 may include a platform 108 that supports a test component 110 and a controller 112. The test component 110 may embody several different devices (e.g., resident "master" meters, blowers, sensors, etc.) that operate to facilitate the meter proof. Test instrumentation 114 may couple the controller 120 with the meter-under-test 102 and the test component 110, where applicable. Examples of the test instrumentation 114 may include cables, connectors, and like devices that can allow data exchange between the meter 102 and the controller 112 (or, the test apparatus 100 generally). These devices may also be equipped for "wireless" or non-contact communication, where information can pass between devices without physical contact.

The controller 112 may operate to control the test apparatus 100 to administer the meter proof. This device may include "controller components" like a processor 116 with access to memory 118, shown to reside locally on the test apparatus 100 but may also be remote as part of a cloud-based system with access provided via networking technology. The memory 118 may include executable instructions 120 and data 122 relevant to the meter-under-test 102. As shown, the data 122 may reside in or as part of one or more data tables (e.g., a first data table 124). The data table 124 (also "database 124") may have a data structure that includes one or more entries (e.g., a first entry 126, a second entry 128, and a third entry 130). The entries 126, 128, 130 associate the data 122 ("entry data") to particular devices, for example, gas meters with different characteristics that may be the meter-under-test 102 for the meter proof. In use, an end user may utilize a remote device 132 like a laptop, tablet, or smartphone (or, generally, a computing device) to communicate and exchange information with the test apparatus 100. These devices may have a display 134 to view data and information, often transferred from the test apparatus 100. This transfer may occur via a web browser 136 that provides a user interface 138 on the display 134.

Broadly, the test apparatus 100 offers a unique solution that simplifies stages necessary to imitate the meter proof to characterize the meter-under-test 102. The embodiments use the data 122 in the data table 124 to manipulate the user interface 138 in response to data entry by the end user on the remote device 132. This feature, in turn, walks the end user through the test initialization process through a series of simple "web pages" that render through the web browser 136 on the display 134. In this way, the embodiments significantly reduce the amount of data entry by the end user to a meaningful subset of information. This subset of information is, generally, readily available to individuals independent of their relative skill and knowledge of the test apparatus 100, the meter-under-test 102, and meter proof process. In turn, the proposed design can allow individuals with little (or know experience) to operate the test apparatus 100 to perform the meter proof process, which in the past might require months of appropriate training.

Communication between the test apparatus 100 and the remote device 132 may leverage communication protocols and data formats that comport with use of the web browser 136. The executable instructions 120 may be configured for the controller 112 to operate as a web server. This web-server software allows the controller to "serve-up" the user interface 138 via the web browser 136, effectively operating as a server in a client-server relationship (or model) with the remote device 132 to host display pages for display on the user interface 138. This web-server software allows the controller 112 to "serve-up" the user interface 138 via the web browser 136. These improvements, in turn, configure the test apparatus 100 to deliver different configurations for the user interface 138 to guide the end user from initial set-up of the test apparatus 100 to administration of the meter proof. Data processing can tailor each of the different configurations of the user interface 138 to correspond with data entry by the end user.

Use of this client-server model to transfer data and information among devices benefits the process to initialize the test apparatus 100 for use with the meter-under-test 102. For example, practices in the field may require a remote computing device (e.g., remote device 132) to couple directly (via a cable) with the control structure on the test apparatus. Application-specific software resident on the remote computing device drives the operation of the test apparatus and, often, can perform analytics as well. The embodiments here, however, offer server-related functionality on the test apparatus 100 that was not previously available. This feature creates a "smart" cart to streamline both operation and administration of the meter proof, as well as to avoid software compatibility issues that may render test systems operating under the current paradigm inoperative and reliant on software patches and fixes to percolate through other parts of the test system.

The controller 112 may leverage data formats to facilitate data exchange. These formats include uniform resource locators (URLs) and like web addresses and/or indicators in combination with hypertext transfer protocol (HTTP) to complete the requisite exchange of information between these devices. For purposes of simplifying the calls and outputs, the data formats may conform with representational state transfer ("REST") structure. This structure offers a lightweight alternative to other architectures that are used by conventional data exchange techniques. This lightweight structure simplifies the calls and data requests and outputs that are generated in response to the calls. The device may also include an application programming interface (API), using the REST structure, to allow for customization of the display pages, as desired.

The controller 112 may be outfit with hardware that allows the test apparatus 100 to perform functions to execute the meter proof essentially autonomously. These functions, for example, regulate operation of the test component 110. The functions may also process data to quantify the operative characteristics of the meter-under-test 102. Moreover, the controller 112 can be configured to read, write, and/or store data to a repository (also "database") like memory 118 whether found on-board or remote from the test apparatus 100.

Figure 2:
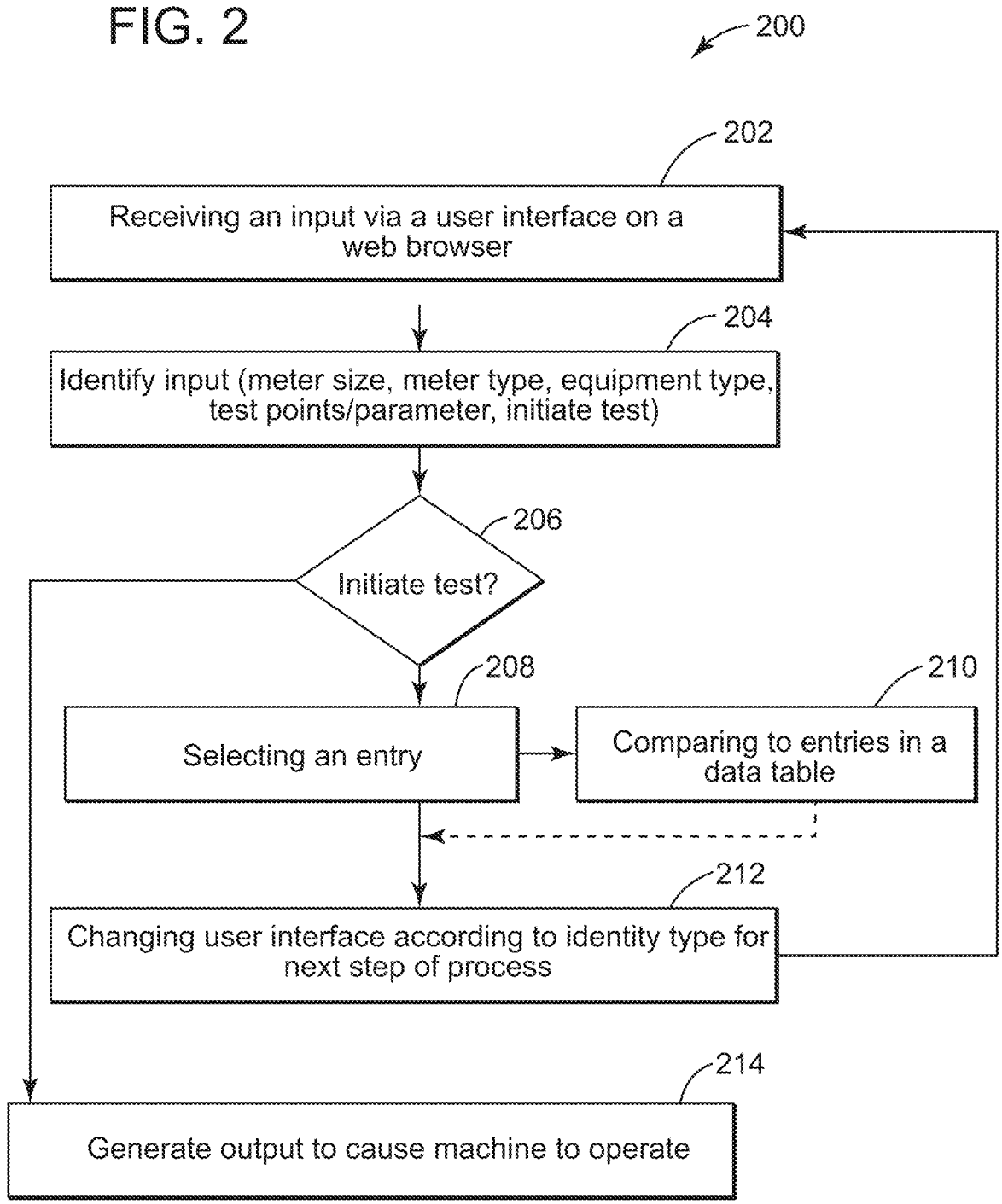
FIG. 2 depicts flow diagram of an exemplary embodiment of a method to initialize the test apparatus of FIG. 1 to run the meter proof.

With continued reference to FIG. 1 throughout, FIG. 2 illustrates a flow diagram of an exemplary embodiment of a method 200 to initialize a test apparatus to run a test protocol (or "meter proof") on the meter-under-test 102. This diagram outlines stages that may embody executable instructions 120 for one or more computer-implemented methods and/or programs. The executable instruction 120 may be stored on the memory 118 as firmware or software. The stages in this embodiment can be altered, combined, omitted, and/or rearranged in some embodiments.

Operation of the method 200 may afford the end user with a simple, streamlined experience via the user interface 138 to prepare the test apparatus 100 to run the meter proof on the meter-under-test 102. The method 200 may include, at stage 202, receiving an input via a user interface on a web browser and, at stage 204, identifying the input. The method 200 may also include, at stage 206, determining whether the input is to initiate the meter proof. If not, then the method 200 may continue, at stage 208, selecting an entry, where the method 200 may include, at stage 210, comparing the input to entries in a data table. The method 200 may further include, at stage 212, changing the user interface according to the entry. In one implementation, the method 200 may return back to stage 202 to receive the input again, which may change based on the changes to the user interface as discussed further below. If the input is to initiate the meter proof, then the method 200 may continue, at stage 214, generating an output that changes a state of a test component on the test apparatus.

At stage 202, the method 200 receives the input from the user interface 138. Examples of the user interface 138 may be configured to solicit information from the end user. The web browser 136 may be useful for this purpose because it provides a "universal" access point to deliver and receive data to the remote device 132. In use, the end user can leverage this access point to gain access to the controller 112. The method 200 may include one or more stages, for example, for forming the user interface to solicit login credentials from the end user and beginning to run the test initialization process in response to proper login credentials.

Figure 3:
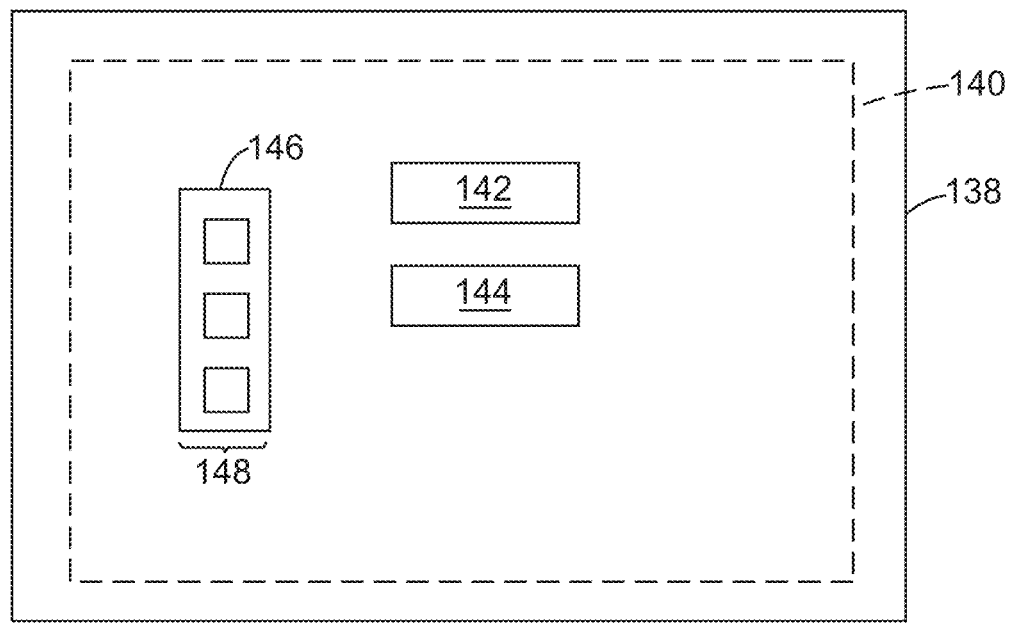
FIG. 3 depicts schematic diagram of an example of a user interface for use in the test initialization process of FIG. 2.

FIG. 3 provides a schematic diagram of an example of the user interface 138 for use in the test initialization process. The user interface 138 may include a content area 140 with a data display area 142 and a data entry area 144. In one example, the content area 140 can include a stage indicator 146, shown here as a stage tree 148 that is useful to associate the configuration of the content area 140 with the step or stage of the test initialization process. This feature may operate to guide the end user, effectively providing a "road map" that updates as the end user moves along the test initiation process.

At stage 204, the method 200 may identify the input from the user interface 138. The input may vary depending on the configuration of the content area 140. Generally, the input may include data (also "input data") that preferably defines or describes information about the meter-under-test 102. The method 200 can use this data, in turn, to properly coordinate operating parameters of the test apparatus 100, for example, with specific characteristics or specifications for the meter-under-test 102. In one implementation, the data may include meter identifying data that relates to features of the meter-under-test 102, often to define an identity for the device so as to properly initialize the test apparatus 100 for the test procedure. These features include, for example, size, type, model, serial number, and the like. The data may also include instrumentation identifying data that relates to the test instrumentation 114, whether stored in memory in the first data structure and another (e.g., second data structure) with entries arranged as contemplated herein. This data can define an identity for cables, connectors, sensors, and like devices that may be used to gather and exchange data with the meter-under-test 102. It may also be helpful that the data include test parameter data. Examples of test parameter data may define test points (e.g., high and low limits for flow rate) and the like.

At stage 206, the method 200 determines whether to initiate the meter proof. The content area 140 may include, for example, an icon (or button) for this purpose. This icon may become selectable for the end user to actuate in order to start or run the test protocol following the initiation process. In one implementation, this stage may include one or more stages for comparing the input data to a predetermined value or other indicator that coincides with the end or completion of the test initiation process.

At stage 208, the method 200 may use the input data to select one of the entries 126, 128, 130 from the data table 124. The selected entry may provide data that is useful to continue the test initialization process. In one implementation, the method 200 may, at stage 210, compare the input data to data in the entries 126, 128, 130, wherein the selected entry reflects a match that relates the input data with at least part of the entry data. A failure to find such match may stall the test initialization process or, possibly, permit the end user to create a new entry into the data table 124. This new entry may reflect a new or different model for the meter-under-test 102 or the test instrumentation 114.

At stage 212, the method 200 may change the user interface 138 in response to the selected entry. These changes may affect the configuration of all or part of the content area 140. For example, the configuration may change from a first configuration to a second configuration, where the differences between these two configurations relate the content area 140 to the "next" stage of the test initialization process.

FIGS. 4, 5, 6, and 7 depict diagrams for exemplary configurations of the user interface 138. These diagrams may help visualize exemplary changes to the content area 140 that might occur during the test initialization process. At a high level, the method 200 is configured to provide the end user with a "guided" experience. This feature drives subsequent configurations of the user interface 138 to solicit specific information from the end user based, at least in part, on previously-entered data. In this way, the method 200 may be configured to control certain sections of the content area 140 or even to limit the data entry by the end user during the test initialization process. For example, once the end user identifies the size of the meter-under-test 102, the method 200 may limit subsequent data entry to selections (e.g., model numbers) that only coincide to that size. This "active" data limitation may reduce mistakes from both novice or inexperience end users with limited knowledge of the test protocols or the test apparatus and even the most experience individuals because the embodiments require limited data entry only within certain limits of available data.

Figure 4:
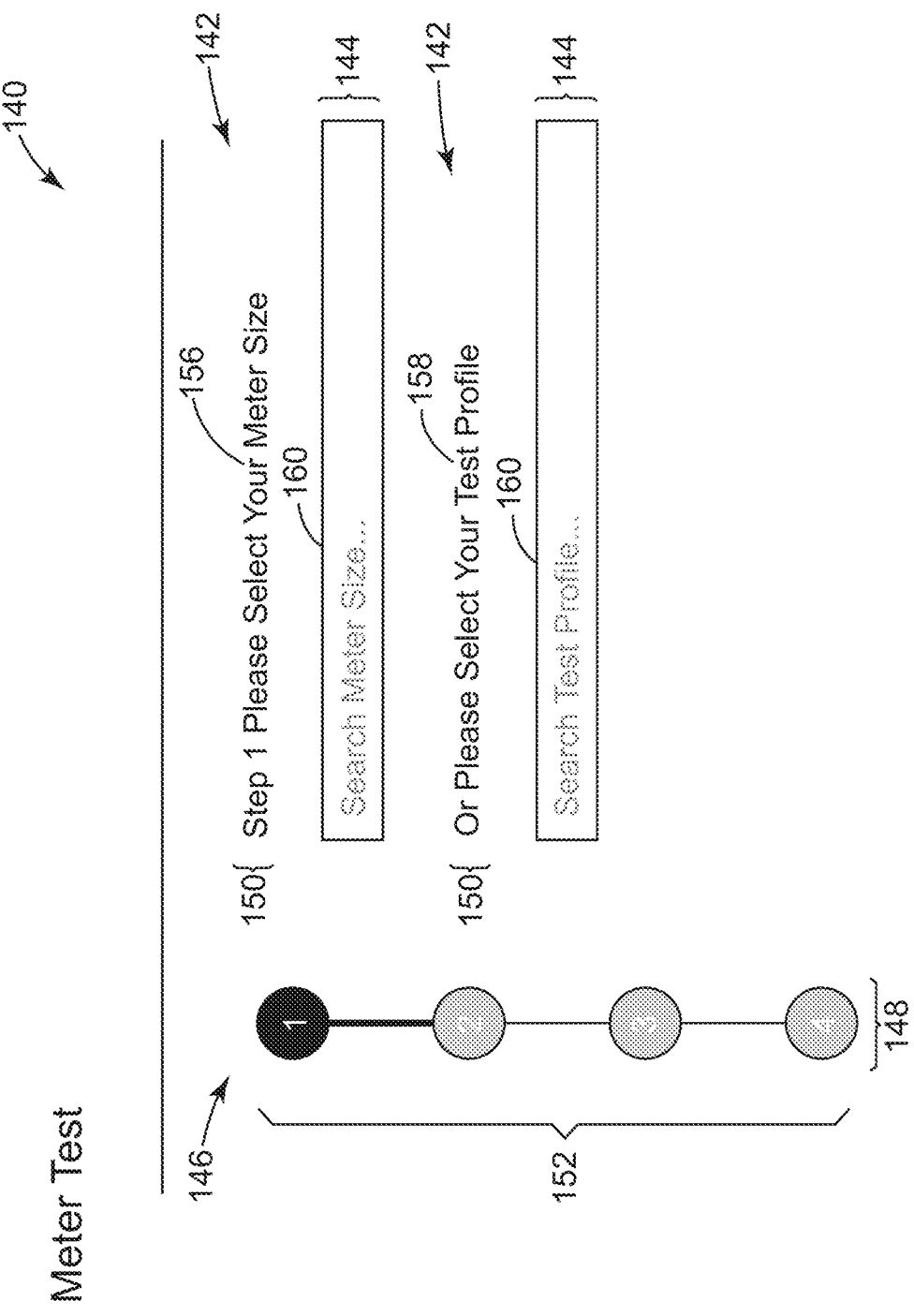
FIG. 4 depicts an example of the user interface of FIG. 3.

FIG. 4 depicts the configuration of the content area 140 for a first stage of the process. The data display area 142 includes instruction content 150, shown here as a pair of instructions for the end user to consider as part of the test initialization process. The stage tree 148 is arranged as a multi-tier indicator 152. In this implementation, the indicator 152 comprises enumerated, visual identifiers that correspond with the stage of the test initialization process (and with the "1" identifier "highlighted" to clearly articulate to the end user this stage). The instruction content 150 may include one or more instructions (e.g., a first instruction 156 and a second instruction 158). The instructions 156, 158 prompt the end user to take some action. The first instruction 156 may solicit meter identifying data from the end user in the data entry area 144 as a data entry box 160. The end user can type in the "size" of the meter here; although it is possible that a drop-down menu may be useful to provide a pre-determined listing of specific sizes (or other information). For purposes of this example, the method 200 may include one or more stages for comparing data from the data entry box 160 in real-time and, in turn, for pre-populating the data entry box 160 in connection with each of the manually-entered characters by the end user. As also shown, the second instruction 158 may solicit a name for a previously-stored test profile that defines all or at least part of the data necessary to complete the test initialization process. These test profiles may reside in the data table 124, either as part of entries 126, 128, 130 or as separate tabulated content. Use of the test profile can by-pass the test initialization process because the test profile has all the information necessary to operate the test apparatus 100 to administer the meter proof on the meter-under-test 102.

Figure 5:
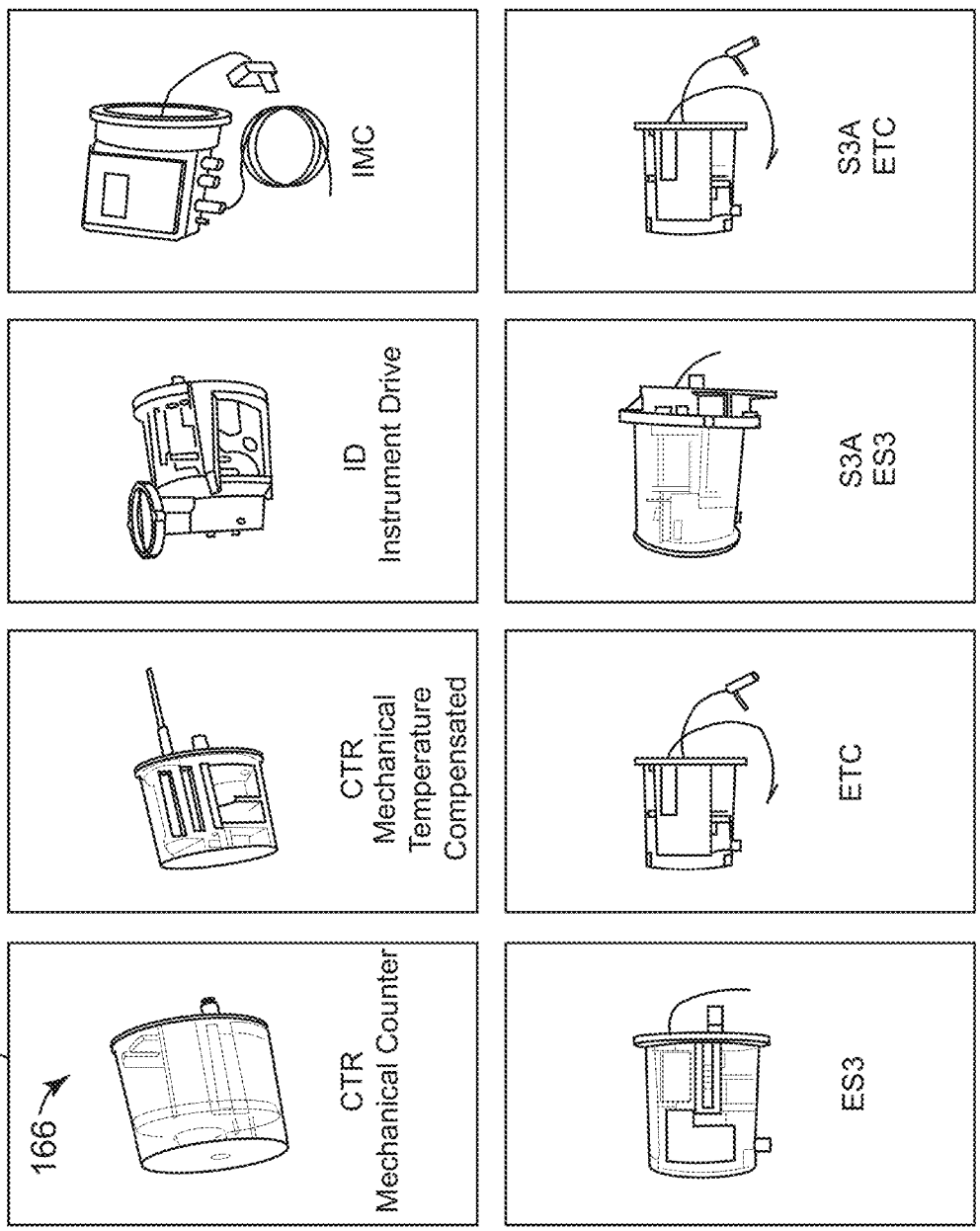
FIG. 5 depicts an example of the user interface of FIG. 3.

FIG. 5 depicts a second configuration for the content area 140 that may coincide with a second stage of the process. This second stage may occur after the end user identifies the "size" of the meter-under-test 102 in response to the first instruction 156 of FIG. 4. In one implementation, the second configuration highlights the "2" identifier to clearly articulate this second stage to the end user. The content area 140 may include a MUT identification area 162 that displays, for example, information that identifies the meter-under-test 102. The instruction content 154 reflects a third instruction 164 to prompt the end user to identify the "type" of meter. While manual data entry or drop down menu may work, the data entry area 144 here includes one or more selectable icons 166 in the form of images. Examples of the images 166 provide visual representation of different types of meters, preferably only those associated with the "size" noted above and highlighted in the MUT identification area 162. In use, the end user can select among the images 166 to appropriately address the third instruction 164.

Figure 6:
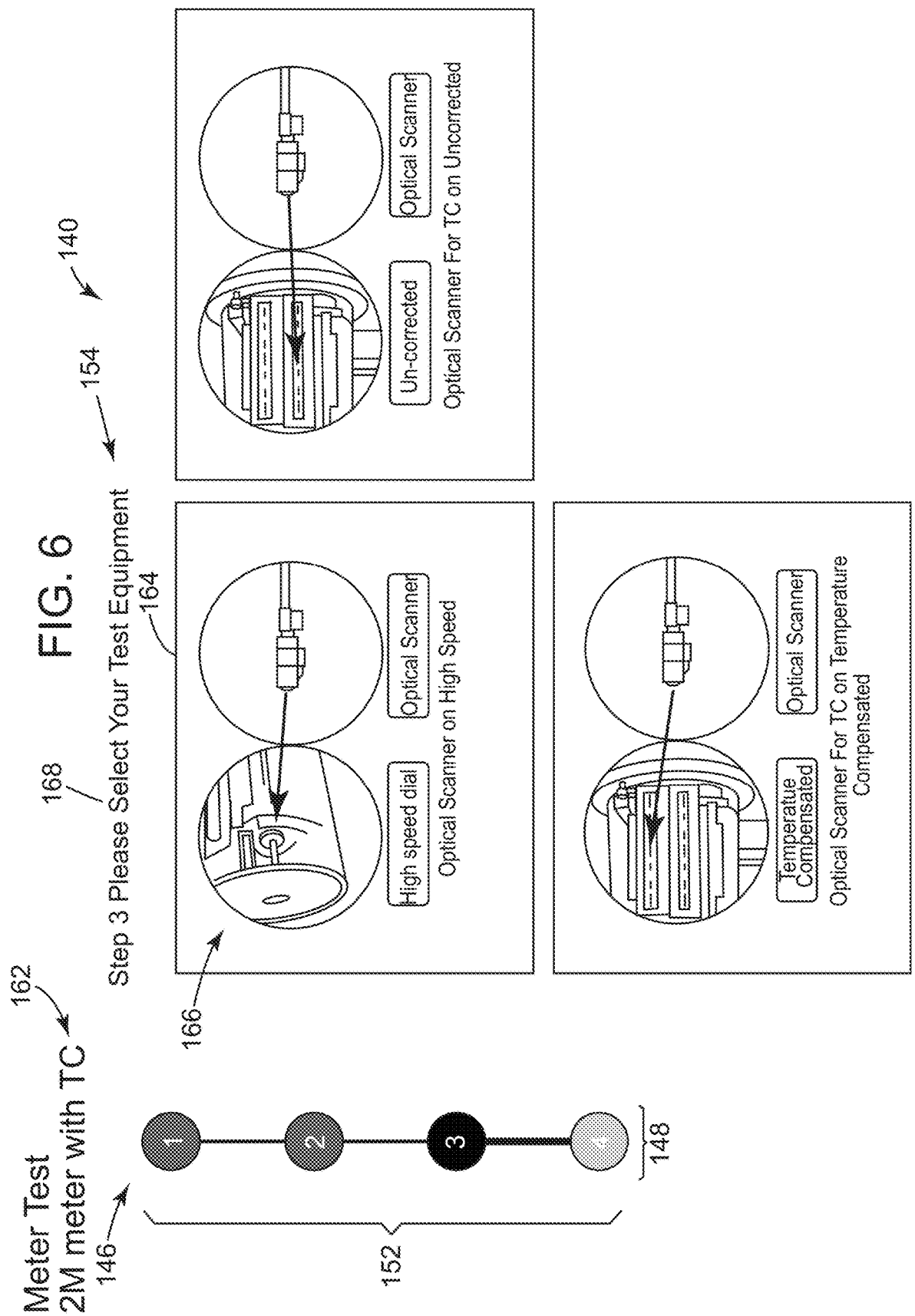
FIG. 6 depicts an example of the user interface of FIG. 3.

FIG. 6 depicts a third configuration for the content area 140 that may coincide with a third stage of the process. This third stage may follow subsequent to selection of the "type" for the meter-under-test 102. The third configuration may highlight the "3" identifier to clearly articulate this third stage to the end user and, in one example, can update the MUT identification area 162 with the "type" information as well. In one implementation, the instruction content 154 reflects a fourth instruction 168 to prompt the user to enter instrument identifying information to articulate the test instrumentation 114 that is being used in connection with meter-under-test 102. Selectable icons 164 may change so that the images 166 provide visual representation of the "types" of devices that could be used for the test instrumentation 114. These types may also be limited based on, for example, the previous "size" or "type" for the meter-under-test 102.

FIG. 7 depicts a fourth configuration for the content area 140 that may coincide with a fourth stage of the process. This fourth stage may follow subsequent to selection of the "type" of the test instrumentation 114. The fourth configuration may highlight the "4" identifier to clearly articulate this fourth stage to the end user and, in one example, the MUT identification area 162 also includes the "type" information as well (and in addition to the information on the meter-under-test 102). In one implementation, the instruction content 154 has a fifth instruction 170. Here, the instruction prompts the end use to enter test parameter data into the data entry box 160, shown as a drop-down selection that limits the possible parameter data based on the previously entered information. The content area 140 also includes a data display 172 that sets out certain, select information about the test protocol. In one example, the data display 172 may include data entry point 174 that allows the end user to further tailor the test protocol as desired. Further, the content area 140 may include a pair of options (e.g., first option 176 and a second option 178). The options 176, 178 may provide selectable items or icons for the end user to use. The first option 176 may allow the end user to "save" the test profile that was developed over the course of the stages of the test initialization process. Noted above, in connection with FIG. 4, this feature coincides with the second instruction 158 that solicits a name for a previously-stored test profile. The second option 178 allows the end user to "start," "run," or "initiate" the meter proof.

Turning back to FIG. 2, and also FIGS. 1 and 3, at stage 214, the method 200 may generate an output to cause the test apparatus 100 to implement the meter proof. This output may occur in response to use of the "run" option 176 discussed above in relation to FIG. 7. In one implementation, the output can activate the test component 110 to flow the test gas through the meter-under-test 102. The output can also modify the content area 140 of the user interface 138 to allow the end user to observe, in real-time, the progress of the meter proof.

Figure 8:
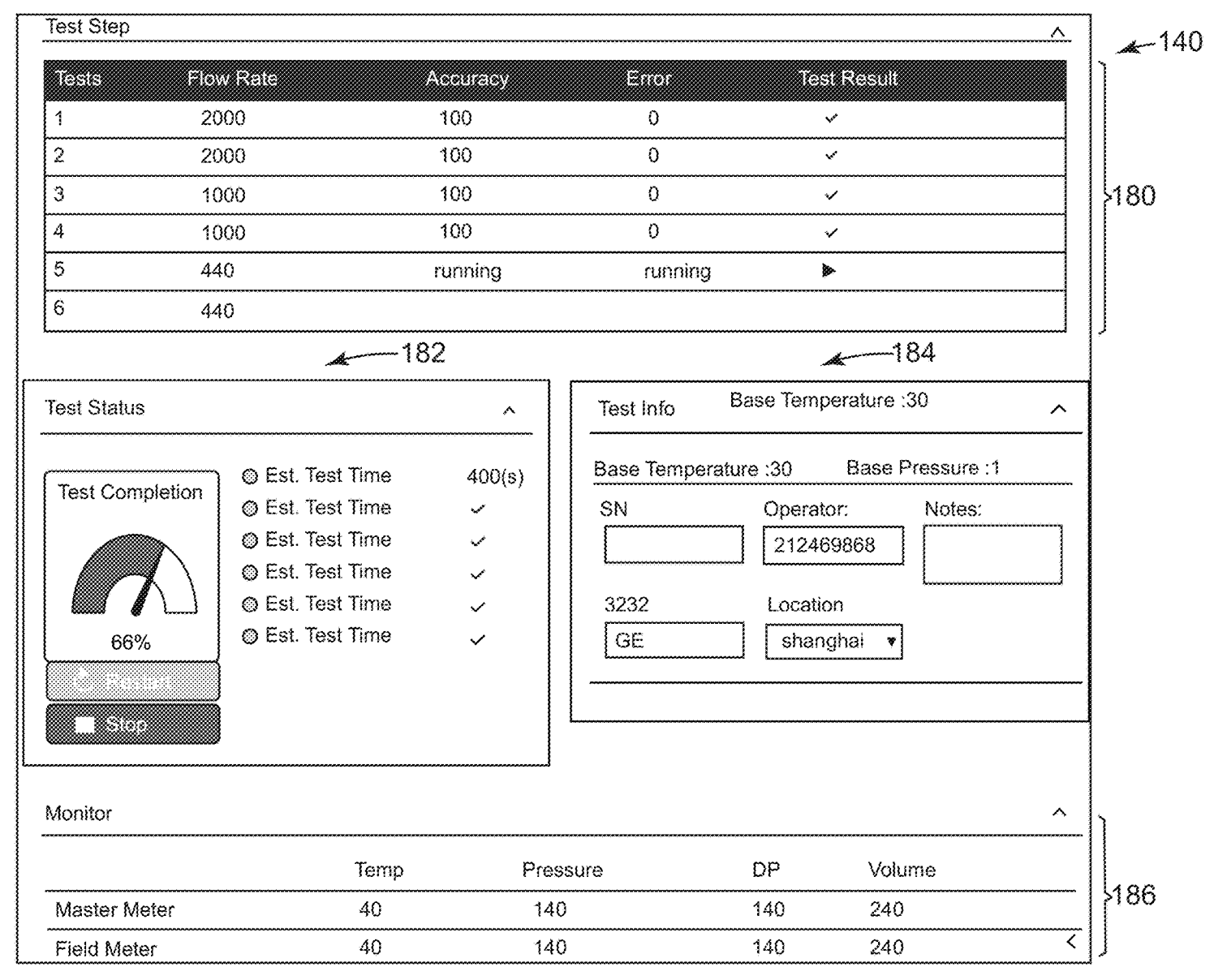

In this regard, FIG. 8 depicts a diagram a fifth configuration of the user interface 138 that may occur during the meter proof. Here, the content area 140 may include a test identification area 180 with visual indication (e.g., text) to indicate operation of the test apparatus 100 to administer the proof. The content area 140 may also include one or more test status area that features a test status area 182, test info area 184, and test monitor area 186. Collectively, the areas 182, 184, 186 can present data and information in formats that are useful to the end user. These formats can include charts, listings, and tables. For example, the test monitor area 186 may provide data that relates the performance of the meter-under-test 102 to a master meter found among the test component 110. The test info area 184 may be configured for the end user to enter notes and other information that may be relevant to the ongoing meter proof.

FIG. 9 depicts the test apparatus 100 of FIG. 1 to inform the following discussion of other features of the device. The platform 108 may be configured to transit among locations (e.g., from a first position to a second position), as indicated by the arrow enumerated T. These configurations may take advantage of wheels, castors, and like operative elements for this purpose. The test component 110 may include a fluid moving unit 188 that couples with and is configure to transfer a fluid F through a meter-under-test 102 and one or more master meters (e.g., a first master meter 190). In one implementation, the fluid F can exhaust from the fluid moving device 102 into the platform 108. The test component 110 also has a diagnostic unit with sensors 192 that couples with the controller 112, one each disposed on the target meter 102 and the first master meter 190. Examples of the sensors 192 can include thermocouples, thermistors, transducers, and like devices that are sensitive to certain operating conditions on the meters 102, 190. These devices can generate analog and digital signals, wherein the controller 112 is appropriately configured to utilize the type of signal for purposes of the functions disclosed herein.

In light of the foregoing, the improvements here make administration of meter proofs more amenable to the end user. The embodiments are configured to guide the end user through set up and initialization of the test apparatus to perform the meter proof. A technical effect is to provide a test apparatus with functionality to serve up the user interface in various configurations so that each configuration solicits information that relates to the previously-entered information from the prior configuration.

One or more of the stages of the methods (e.g., method 200) can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run and/or reside on the device and/or as software, application, or other aggregation of executable instructions on a separate computer, tablet, lap top, smart phone, and like computing device.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may be embodied in one or more non-transitory computer readable medium(s) having computer readable program code embodied thereon.

Computer program code for carrying out operations for aspects of the present invention may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples below include certain elements or clauses one or more of which may be combined with other elements and clauses describe embodiments contemplated within the scope and spirit of this disclosure.

What is claimed is:

1. A test apparatus, comprising:
a moveable platform;
a blower disposed on the moveable platform;
a master meter coupled with the blower; and
a controller with a processor, a memory, and executable instructions stored on the memory, the executable instructions having instructions that configure the processor to,
receive input data from a web browser;
compare the input data to data in a data table;
select an entry from the data table that reflects a match between the input data and entry data associated with the entry in the data table; and
generate a first output that defines a configuration for a user interface that renders on the web browser, the configuration representing a stage of a test initialization process to configure operating parameters on the controller to work with a meter-under-test that couples with the blower for purposes of conducting a meter proof.

2. The test apparatus of claim 1, wherein the input data corresponds with meter identifying data for the meter-under-test.

3. The test apparatus of claim 1, wherein the input data corresponds with identifying data for test instrumentation that couples with the controller.

4. The test apparatus of claim 1, wherein the first output pre-populates the user interface with meter identifying data.

5. The test apparatus of claim 1, wherein the configuration includes a selectable icon in the form of an image of the meter-under-test.

6. The test apparatus of claim 1, wherein the configuration includes a selectable icon in the form of an image of test instrumentation that couples the controller with the meter-under-test.

7. The test apparatus of claim 1, wherein the configuration includes a selectable icon to cause the controller to activate the blower.

8. The test apparatus of claim 1, wherein the instructions configure the processor to,
 limit subsequent data entry at the user interface so that the input data relates only to the meter-under-test.

9. The test apparatus of claim 1, wherein the instructions configure the processor to,
 recognize the input data to indicate the test initialization process is complete; and
 generate a second output to activate the blower.

10. The test apparatus of claim 1, wherein the instructions configure the processor to,
 activate the blower in response to the input data; and
 include data in the output that relates to performance of the meter-under-test.

11. A test apparatus, comprising:
 a moveable platform;
 a blower disposed on the moveable platform;
 a master meter coupled with the blower; and
 a controller with a processor, a memory, and executable instruction stored on the memory, the executable instructions having instructions that configure the processor to deliver successive web pages to a client device, each of the web pages having a configuration that depends on input data solicited from previously-delivered web pages,
 wherein the successive web pages define stages of a test initialization process to set operating parameters that correspond with a meter-under-test that couples with the blower.

12. The test apparatus of claim 11, wherein the successive web pages solicit a type of meter for the meter-under-test.

13. The test apparatus of claim 11, wherein the successive web pages solicit a size of meter for the meter-under-test.

14. The test apparatus of claim 11, wherein the successive web pages solicit a type of test instrumentation that couples with the meter-under-test to exchange information with the controller.

15. The test apparatus of claim 11, wherein the successive web pages solicit a run option that causes the controller to activate the blower.

16. The test apparatus of claim 15, wherein the successive web pages present data that relates to performance of the meter-under-test to the master meter following the run option.

17. The test apparatus of claim 11, wherein the successive web pages display images of the meter-under-test and test instrumentation.

\* \* \* \* \*